(12) United States Patent  
Cooke et al.

(10) Patent No.: US 9,109,738 B2  
(45) Date of Patent: Aug. 18, 2015

(54) SEALING PLUG FOR QUICK CLOSING COUPLING SYSTEM

(71) Applicant: Line-Safety LLC, Sarasota, FL (US)

(72) Inventors: William Edmund Cooke, Sarasota, FL (US); Karen Anne Swift, Sarasota, FL (US)

(73) Assignee: LINE-SAFETY LLC, Sarasota, FL (US)

( * ) Notice: Subject to any disclaimer, the term of this patent is extended or adjusted under 35 U.S.C. 154(b) by 0 days.

(21) Appl. No.: 14/467,132

(22) Filed: Aug. 25, 2014

(65) Prior Publication Data

US 2015/0053294 A1   Feb. 26, 2015

Related U.S. Application Data

(60) Provisional application No. 61/869,177, filed on Aug. 23, 2013.

(51) Int. Cl.
*F16L 55/10* (2006.01)
*F16L 55/11* (2006.01)
*F16L 55/24* (2006.01)

(52) U.S. Cl.
CPC ............ *F16L 55/1108* (2013.01); *F16L 55/24* (2013.01)

(58) Field of Classification Search
CPC ....... B65D 39/16; B65D 51/242; B65D 39/08
USPC ......... 138/89, 89.1–89.4; 220/212.5; D9/443; D8/356, 396, 395; 24/601.5
See application file for complete search history.

(56) References Cited

U.S. PATENT DOCUMENTS

| | | | | |
|---|---|---|---|---|
| 2,003,460 | A | * | 6/1935 | Paull .......................... 220/212.5 |
| 3,439,942 | A | * | 4/1969 | Moore et al. ................... 285/80 |
| 3,495,797 | A | * | 2/1970 | Ganz ............................. 248/339 |
| 4,566,660 | A | * | 1/1986 | Anscher et al. .............. 248/74.2 |
| D293,205 | S | * | 12/1987 | Nakano ......................... D8/395 |
| 5,287,982 | A | * | 2/1994 | Tsai ............................ 220/212.5 |
| 5,498,333 | A | * | 3/1996 | Canther ...................... 210/198.1 |
| D381,905 | S | * | 8/1997 | Chahed ......................... D9/435 |
| 6,634,501 | B2 | * | 10/2003 | Su et al. ........................ 206/378 |
| 8,136,686 | B2 | * | 3/2012 | Schlatter .................... 220/212.5 |
| 8,215,511 | B1 | * | 7/2012 | Lin ............................. 220/212.5 |
| 8,844,883 | B2 | * | 9/2014 | Tsutsumi ..................... 248/74.2 |
| 2010/0301044 | A1 | * | 12/2010 | Sprecher ....................... 220/210 |

* cited by examiner

*Primary Examiner* — Patrick F Brinson
(74) *Attorney, Agent, or Firm* — Shumaker, Loop & Kendrick, LLP

(57) ABSTRACT

A sealing plug adapted to seal a nut and valve assembly including a threaded end having external threading adapted to threadably engage internal threading of the nut, the threaded end of the sealing plug being open so as to receive a portion of the valve assembly therein, and a hose clip opposite the threaded end including spaced arms defining an opening therebetween for receiving a hose therein.

16 Claims, 5 Drawing Sheets

SEALING PLUG FOR QUICK CLOSING COUPLING SYSTEM

CROSS-REFERENCE TO RELATED APPLICATION

This application claims priority from U.S. Application No. 61/869,177 filed Aug. 23, 2013, the contents of which are incorporated herein by reference.

TECHNICAL FIELD AND BACKGROUND OF THE INVENTION

The present invention relates generally to a plug for sealing against contamination, and more particularly, to a plug configured to sealingly engage within an acme nut of a QCC-1 coupling when the nut is disengaged from a propane cylinder collar.

Newer style gas grills typically include a standardized coupling commonly referred to as a QCC-1 coupling. In this coupling, the outlet collar of a propane cylinder includes an external right hand acme thread, and the end fitting that couples the cylinder to a pressure regulator or hose leading to the grill includes a large, hand-operable nut rotatably mounted on an elongate nipple of the type used in a POL coupling. Engagement of the internal acme thread on the nut with the external acme thread on the outlet collar axially slides the nipple into the inlet, thereby pushing open a self-closing metal diaphragm and allowing gas to flow therethrough. These simultaneous actions require dimensions measured from a datum point of a notional final contact and closure of the acme threads in the nut.

When the nut and collar are disengaged, it is possible for coarse particles and contamination to enter the nut, hose and regulator, thereby restricting gas flow. In coastal areas in particular, finer contaminants and atmospheres can further dissolve out the zinc from the brass alloy of the nipple, resulting in microscopic pitting of the surface of the remaining copper and degrading the sealing ability of the coupling assembly.

Accordingly, it would be desirable to seal the coupling system against contamination when the nut and collar are disengaged.

BRIEF SUMMARY OF THE INVENTION

It is therefore an object of the present invention to provide a plug that protects both the internal acme threading of a nut and the end of the elongate nipple of the type used in a POL coupling when the nut is disengaged from the outlet collar of a propane cylinder.

It is a further object of the invention to integrate a tethering feature into the plug construction such that the plug can be tethered to the regulator hose to prevent separation and loss.

It is a further object of the invention to provide a single piece plug and tether for simplicity, ease of manufacturing and cost reduction.

To achieve the foregoing and other objects and advantages, in a first embodiment the present invention provides a sealing plug including a threaded end having external threading adapted to threadably engage internal threading of a nut, the threaded end of the sealing plug being open, and a hose clip opposite the threaded end including spaced arms defining an opening therebetween for receiving a hose therein.

In a further aspect, the threaded end includes an inner ring concentrically arranged within the opening of the threaded end and recessed therefrom.

In a further aspect, the sealing plug includes a shoulder spaced from the threaded end and defining a circumferential chamfer sloped radially inward and facing in the direction of the threaded end.

In a further aspect, the opening between the spaced arms is a C-shaped opening facing in a direction away from the threaded end.

In a further aspect, each of the spaced arms terminates in an enlarged bead and a gap is provided between the enlarged beads.

In a further aspect, the spaced arms are resiliently deformable so as to be pulled apart in opposite directions to increase the size of the opening and the gap between the enlarged beads.

In a further aspect, the threaded end is a tubular cylindrical body and the hose clip is a substantially planar body.

In a further aspect, the sealing plug is a unitary body constructed from a material selected from the group consisting of polyethylene, nylon, PVC and rubber.

In another embodiment, a sealing plug adapted for plugging a nut associated with a valve assembly is provided herein and includes a threaded end having external threading adapted to threadably engage internal threading of the nut, the threaded end being open so as to receive a nipple of the valve assembly therein as the threaded end is axially advanced into the nut, and a hose clip opposite the threaded end, the hose clip including spaced arms defining an opening therebetween for receiving a hose therein.

In a further aspect, the threaded end includes an inner ring concentrically arranged within the opening of the threaded end and recessed therefrom for engaging around a bull-nose of a protruding nipple of the valve assembly to provide a hermetic seal against entry of contamination.

Embodiments of the invention can include one or more or any combination of the above features and configurations.

Additional features, aspects and advantages of the invention will be set forth in the detailed description which follows, and in part will be readily apparent to those skilled in the art from that description or recognized by practicing the invention as described herein. It is to be understood that both the foregoing general description and the following detailed description present various embodiments of the invention, and are intended to provide an overview or framework for understanding the nature and character of the invention as it is claimed. The accompanying drawings are included to provide a further understanding of the invention, and are incorporated in and constitute a part of this specification.

BRIEF DESCRIPTION OF THE DRAWINGS

Features, aspects and advantages of the present invention are better understood when the following detailed description of the invention is read with reference to the accompanying drawings, in which.

DETAILED DESCRIPTION OF THE INVENTION

Figure 1:
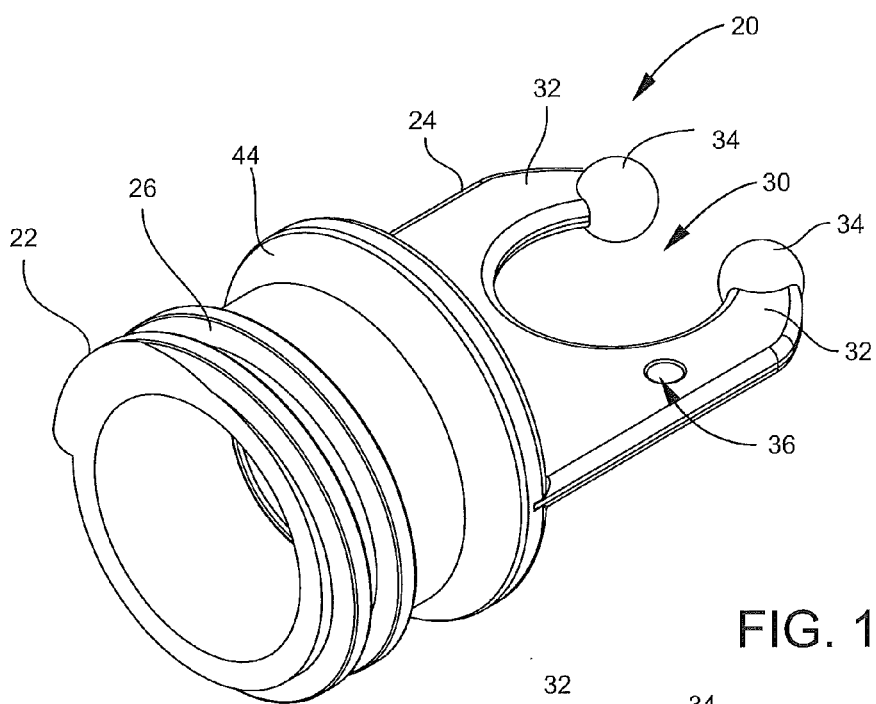
FIG. 1 is an isometric view of a sealing plug according to a preferred embodiment of the invention.
Figure 2:
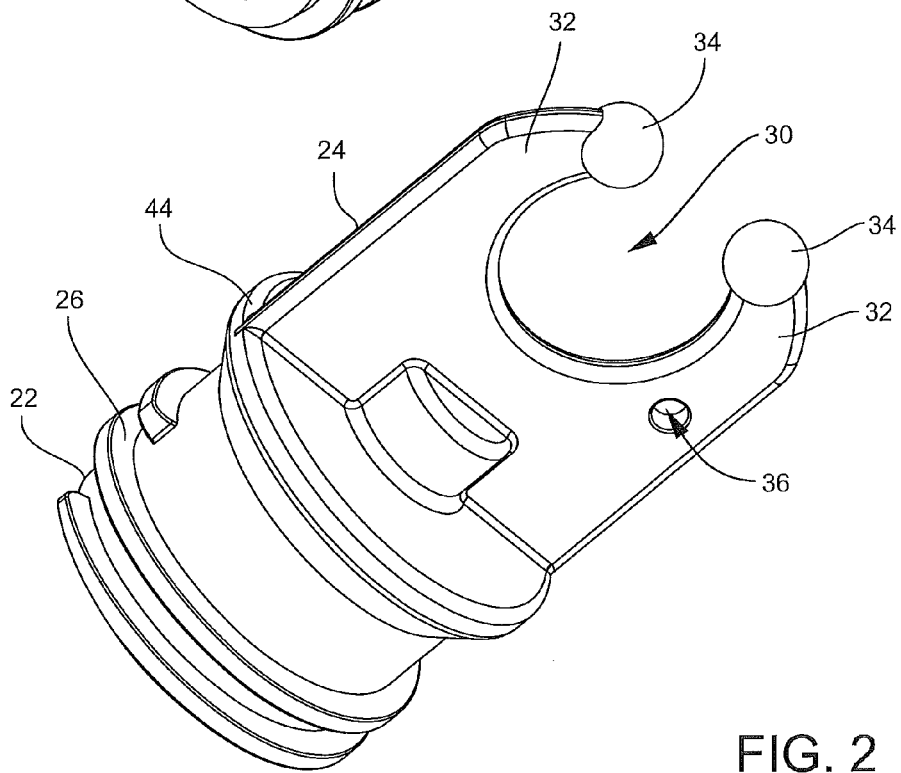
FIG. 2 is another isometric view of the sealing plug.
Figures 3, 4:
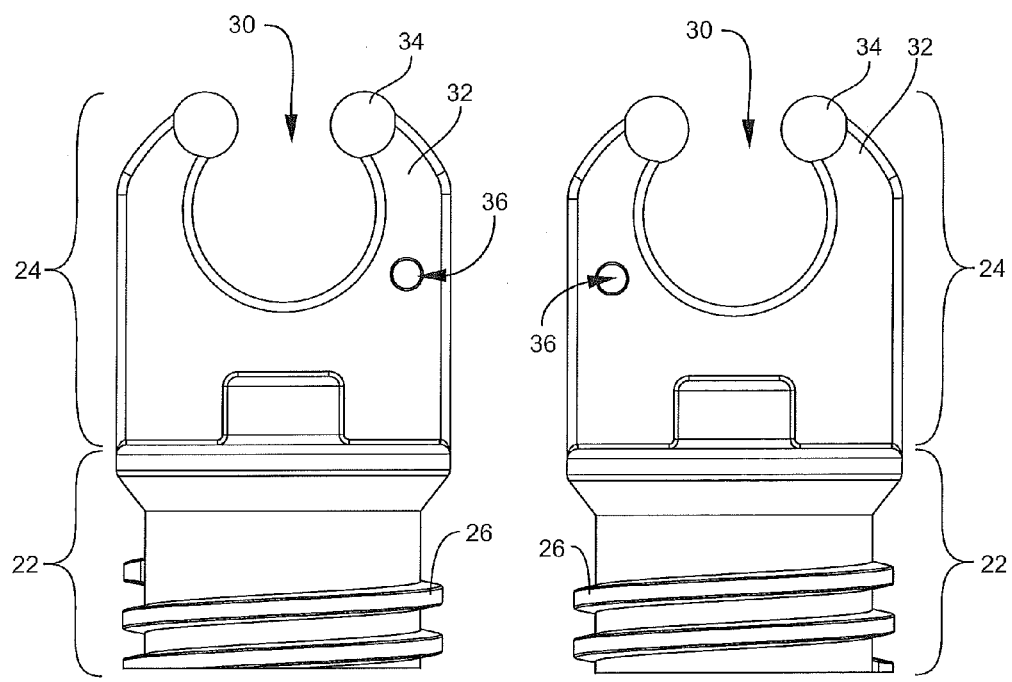
FIG. 3 is a front view of the sealing plug.
FIG. 4 is a rear view of the sealing plug.
Figures 5, 6:
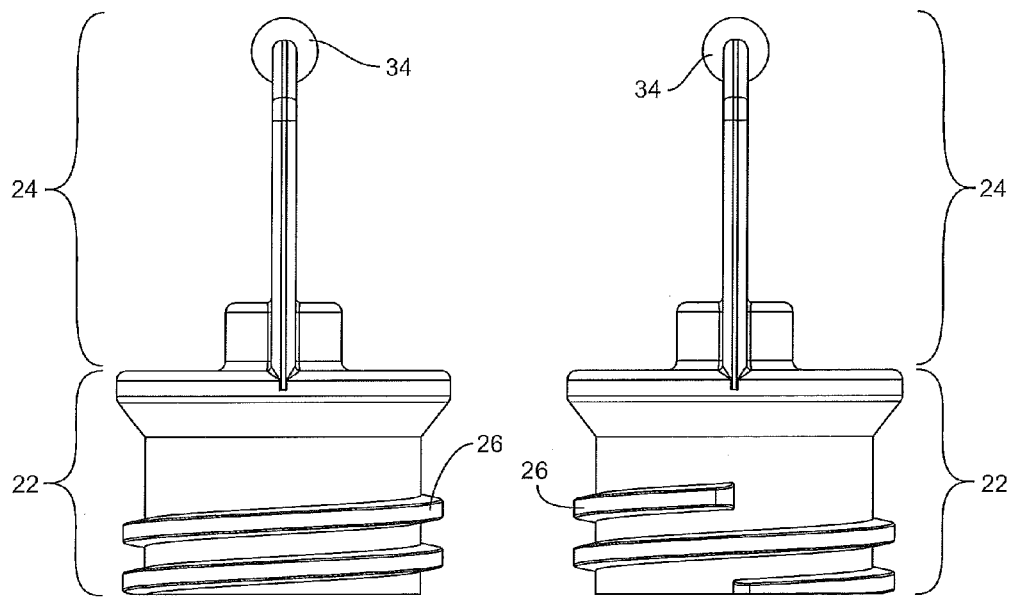
FIG. 5 is a right side view of the sealing plug.
FIG. 6 is a left side view of the sealing plug.
Figure 7:
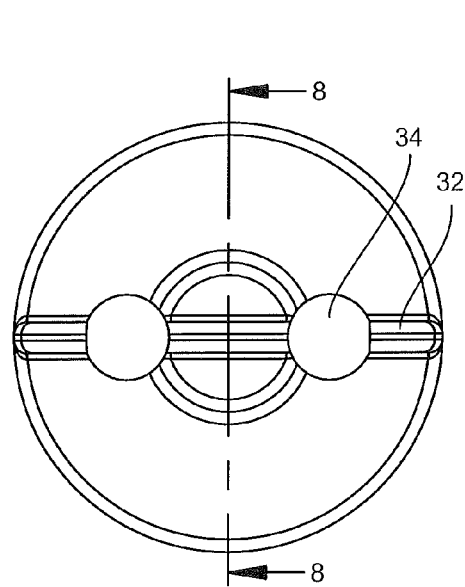
FIG. 7 is a top view of the sealing plug.
Figure 8:
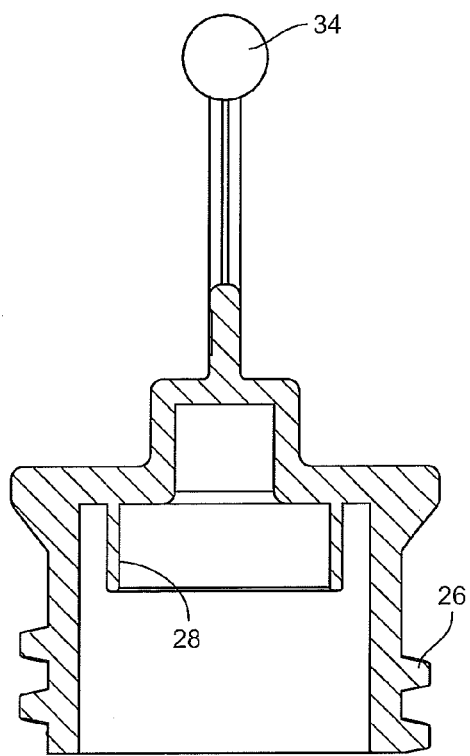
FIG. 8 is a sectional view through the sealing plug taken along line 8-8 of FIG. 7.
Figure 9:
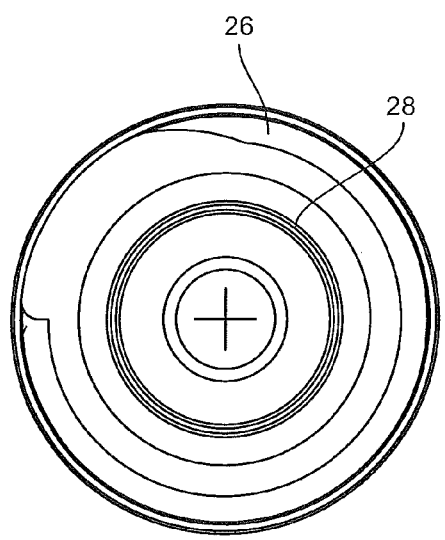
FIG. 9 is a bottom view of the sealing plug.
Figure 10:
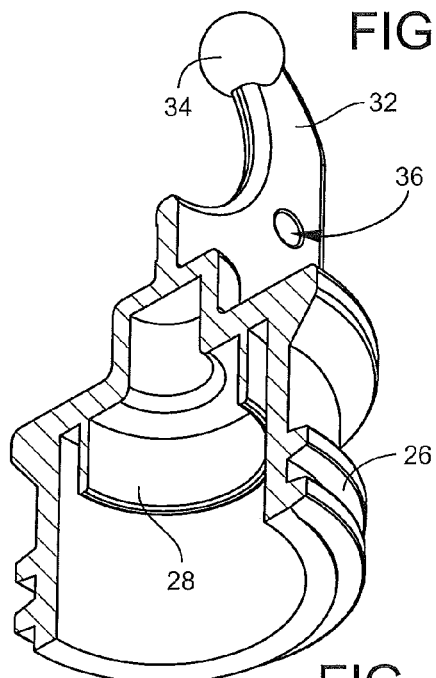
FIG. 10 is a perspective sectional view through the sealing plug taken along line 8-8 of FIG. 7.

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings.

Referring to the figures, a sealing plug according to a preferred embodiment of the invention is shown generally at reference numeral 20. The sealing plug 20 is configured to sealingly engage within a conventional hand-turned nut 40 of a QCC-1 coupling system, the acronym "QCC" standing for "Quick Closing Coupling." The sealing plug 20 functions to protect the internal threading of the nut 40, protect the elongate nipple of the type used in a POL valve or like valve, and generally seal against contamination when the nut is disengaged from a propane cylinder collar. The sealing plug is thus configured to be used prior to the first use of the nut 40 and between tank changes.

Referring to FIGS. 1-10, the sealing plug 20 is externally threaded at one end 22 and defines a tethering feature (e.g., a hose clip) at the opposing end 24 for engaging with a regulator hose or other hose to which the nut is attached. End 22 of the sealing plug is generally cylindrical and is provided with external acme threading 26 adapted to threadably engage complementary internal threading of the nut to effect a tight seal therebetween. Turning the sealing plug 20 in the clockwise direction engages the threads and axially advances the sealing plug into the nut. Spaced from end 22 is a shoulder 44 that engages the front face of the nut when the sealing plug 20 is fully engaged therein to effect a seal therebetween. The shoulder 44 defines a circumferential chamfer sloped radially inward and facing in the direction of the nut that accommodates any slight tolerance in the size of the opening of the nut. When fully tightened, plug end 22 seats against the inner collar of the nut, thereby providing a primary seal against the entry of coarse particles and contamination.

The threaded end of the sealing plug 20 is open to receive the elongate nipple or like structure of the valve as the sealing plug is axially advanced into the nut. An inner ring 28 concentrically arranged within the opening extends a portion of the length of the opening. When fully tightened, the inner ring 28 engages around the bull-nose of the nipple to provide a secondary, hermetic seal against the entry of contamination and the atmosphere. The diameter of the opening through the end 22 of the plug, depth of the opening, diameter of the inner ring 28 and length of the inner ring may vary based on the geometry of the nut and valve. Thus, the plug geometry may be modified to mate with different valve and nut geometries now known or later conceived.

End 24 of the sealing plug 24 includes a tethering feature for removably attaching the sealing plug to a hose, regulator hose or other body of the grill to prevent separation and loss of the plug. As shown, the tethering feature takes the form of a hose clip. The hose clip is a generally planar body extending in the axial direction of the plug and including two like arms 32 each terminating in a round bead 34. The arms 32 are spaced apart and define a generally C-shaped opening therebetween, facing in the direction away from the threaded end, for receiving the cylindrical regulator hose therein. The opening is diametrically larger than the hose diameter so that the hose clip fits loosely around the hose, is able to slide along the length of the hose, and does not restrict gas flow therethrough when attached.

A gap 30 is provided between the ends of the arms 32 for inserting the hose therethrough into the opening. The length of the gap 30 is preferably less than the diameter of the hose such that either compressive force on the hose or manipulation of the arms 32 is required to fit the hose through the gap 30 and come to rest in the opening. The lesser diameter of the gap 30 as compared to the hose prevents the plug 20 from easily being pulled apart from the hose in the axial direction.

The beads 34 are provided to avoid sharp ends on the arms that could potentially puncture the hose during attachment of the plug. The generally planar shape of the hose clip serves as a gripping feature for grabbing and turning the plug to tighten the plug in the nut. The arms 32 are sufficiently thin and may be resiliently deformable so as to be manipulated in opposite directions to increase the size of the gap 30 when fitting around the hose. The shape of the opening and arm configuration may be modified to accommodate different hose geometries and sizes.

The sealing plug 20 may optionally include a small opening through the tethering end for receiving a secondary tether, for example a strap, chain, etc. for attaching the sealing plug to other structure of the grill, for example, where the hose diameter is larger than the C-shaped opening.

The sealing plug 20 may be constructed from any material suitable for effecting a seal and withstanding an outdoor environment, examples of which include, but are not limited to, polyethylene, nylon, PVC, rubber and like materials. As shown, the external threads 26 are specific to a conventional QCC-1 coupling nut, but may be modified to accommodate other configurations.

Figure 11:
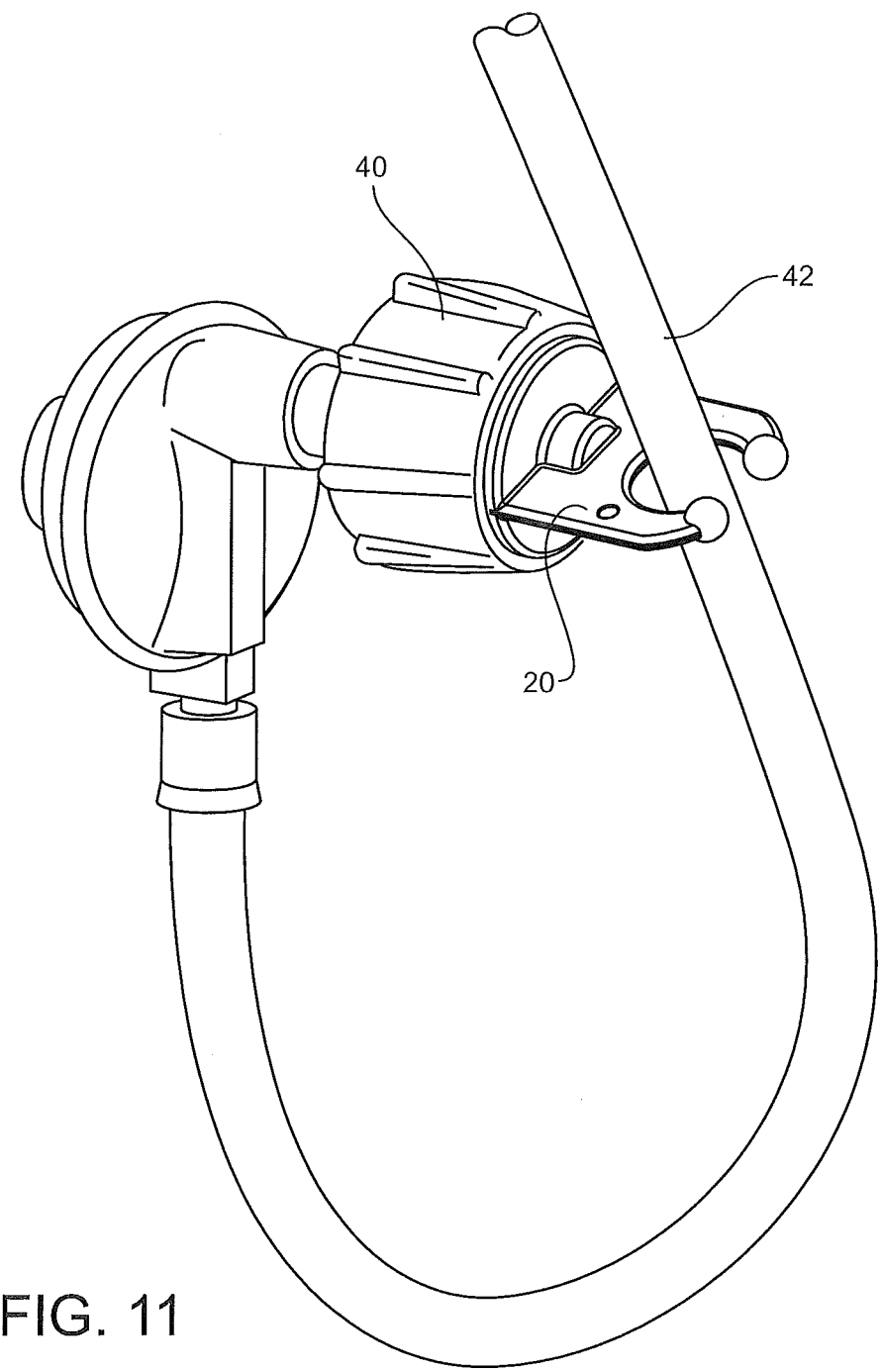
FIG. 11 shows the sealing plug engaged within a nut and tethered to the regulator hose.

Referring to FIG. 11, in use, the sealing plug 20 may be installed prior to initial tank hook-up, between tank changes or anytime the nut 40 is disconnected from a tank collar. To install the sealing plug, the threaded end 22 is axially aligned with the respective nut 40 opening and rotated to engage the external threads 26 of the plug with the internal threads of the nut. The sealing plug 20 is advanced into the nut 40 by rotating the plug in one direction (e.g., clockwise), and withdrawn from the nut by rotating the plug in the opposite direction (e.g., counter-clockwise). The sealing plug 20 may be handled by gripping the plug body or the hose clip end 24. Once installed, the hose 42 may be clipped in, providing the additional advantage of hose management.

Figure 12:
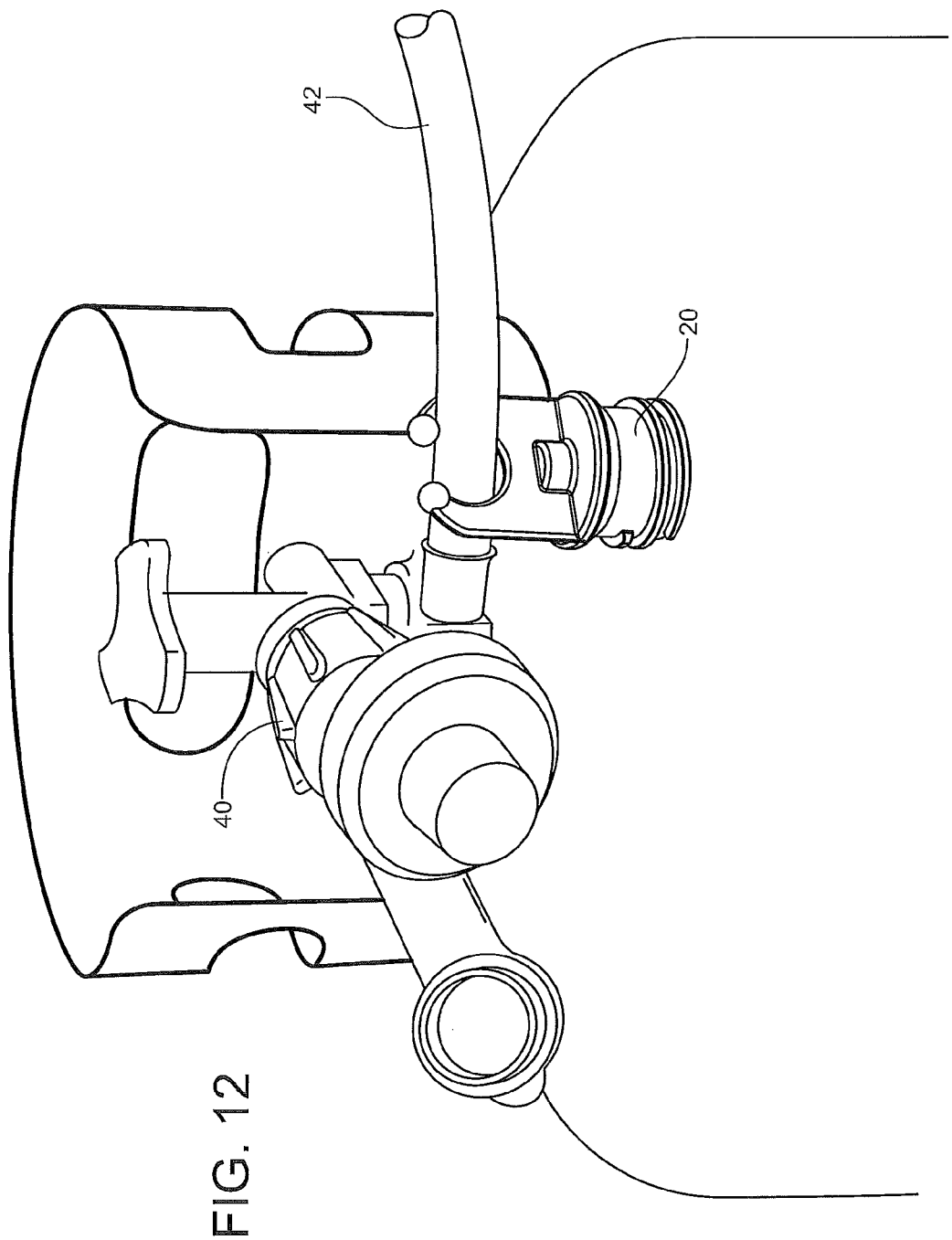
FIG. 12 shows the sealing plug disengaged from the nut and tethered to the regulator hose.

Referring to FIG. 12, when not in use, the sealing plug 20 is loosely attached to the hose 42 and able to slide along the length thereof. When needed, the sealing plug 20 is pulled from the hose 42, screwed into the nut 40 and may be reattached to the hose.

The foregoing description provides embodiments of the invention by way of example only. It is envisioned that other embodiments may perform similar functions and/or achieve similar results. Any and all such equivalent embodiments and examples are within the scope of the present invention and are intended to be covered by the appended claims.

What is claimed is:

1. A sealing plug, comprising:
    a threaded end having external threading adapted to threadably engage internal threading of a nut, the threaded end of the sealing plug being open;

a hose clip opposite the threaded end, the hose clip including spaced arms defining an opening therebetween for receiving a hose therein; and an inner ring concentrically arranged within the opening of the threaded end and recessed therefrom.

2. The sealing plug of claim 1, further comprising a shoulder spaced from the threaded end, the shoulder defining a circumferential chamfer sloped radially inward and facing in the direction of the threaded end.

3. The sealing plug of claim 1, wherein the opening between the spaced arms is a C-shaped opening facing in a direction away from the threaded end.

4. The sealing plug of claim 1, wherein each of the spaced arms terminates in an enlarged bead.

5. The sealing plug of claim 4, wherein the enlarged beads are spaced apart to provide a gap therebetween.

6. The sealing plug of claim 1, wherein each of the spaced arms are resiliently deformable so as to be pulled apart in opposite directions to increase the size of the opening.

7. The sealing plug of claim 1, wherein the threaded end is a tubular cylindrical body and the hose clip is a substantially planar body.

8. The sealing plug of claim 1, wherein the sealing plug is a unitary body constructed from a material selected from the group consisting of polyethylene, nylon, PVC and rubber.

9. A sealing plug adapted for plugging a nut associated with a valve assembly, comprising:
    a threaded end having external threading adapted to threadably engage internal threading of the nut, the threaded end being open so as to receive a nipple of the valve assembly therein as the threaded end is axially advanced into the nut;
    a hose clip opposite the threaded end, the hose clip including spaced arms defining an opening therebetween for receiving a hose therein; and
    a shoulder spaced from the threaded end, the shoulder defining a circumferential chamfer sloped radially inward and facing in the direction of the threaded end.

10. The sealing plug of claim 9, wherein the threaded end further comprises an inner ring concentrically arranged within the opening of the threaded end and recessed therefrom for engaging around a bull-nose of a protruding nipple of the valve assembly to provide a hermetic seal against entry of contamination.

11. The sealing plug of claim 9, wherein the opening defined between the spaced arms is a C-shaped opening facing in a direction away from the threaded end.

12. The sealing plug of claim 9, wherein each of the spaced arms terminates in an enlarged bead, and wherein the enlarged beads are spaced apart to provide a gap therebetween.

13. The sealing plug of claim 12, wherein each of the spaced arms are resiliently deformable so as to be manipulated to increase the size of the gap between the enlarged beads.

14. The sealing plug of claim 9, wherein each of the spaced arms are resiliently deformable so as to be pulled apart in opposite directions to increase the size of the opening defined therebetween.

15. The sealing plug of claim 9, wherein the threaded end is a tubular cylindrical body and the hose clip is a substantially planar body.

16. The sealing plug of claim 9, wherein the sealing plug is a unitary body constructed from a material selected from the group consisting of polyethylene, nylon, PVC and rubber.

\* \* \* \* \*